US006816965B1

(12) United States Patent
Moore et al.

(10) Patent No.: US 6,816,965 B1
(45) Date of Patent: Nov. 9, 2004

(54) METHOD AND SYSTEM FOR A POLICY ENFORCING MODULE

(75) Inventors: Charles R. J. Moore, Brisbane (AU); Peter V. O'Connor, Moorooka (AU)

(73) Assignee: Spyrus, Inc., San Jose, CA (US)

( * ) Notice: Subject to any disclaimer, the term of this patent is extended or adjusted under 35 U.S.C. 154(b) by 0 days.

(21) Appl. No.: 09/354,234

(22) Filed: Jul. 16, 1999

(51) Int. Cl.$^7$ .......................... G06F 11/30; H04L 9/00
(52) U.S. Cl. ...................... 713/158; 713/155; 713/200
(58) Field of Search .............................. 713/156, 157, 713/200, 201, 158, 155, 151

(56) References Cited

U.S. PATENT DOCUMENTS

| | | | | |
|---|---|---|---|---|
| 4,919,545 | A | | 4/1990 | Yu .............................. 380/25 |
| 5,164,988 | A | * | 11/1992 | Matyas et al. .............. 713/156 |
| 5,339,403 | A | | 8/1994 | Parker ........................ 395/425 |
| 5,412,717 | A | | 5/1995 | Fischer ......................... 380/4 |
| 5,457,746 | A | | 10/1995 | Dolphin ........................ 380/4 |
| 5,483,596 | A | | 1/1996 | Rosenow et al. ............ 380/25 |
| 5,659,616 | A | | 8/1997 | Sudia .......................... 380/23 |
| 5,671,412 | A | * | 9/1997 | Christiano ............... 707/104.1 |
| 5,677,953 | A | | 10/1997 | Dolphin ........................ 380/4 |
| 5,703,951 | A | | 12/1997 | Dolphin ....................... 380/25 |
| 5,825,883 | A | | 10/1998 | Archibald et al. ........... 380/25 |
| 6,047,242 | A | | 4/2000 | Benson ........................ 702/35 |
| 6,055,637 | A | | 4/2000 | Hudson et al. ............. 713/201 |
| 6,105,069 | A | | 8/2000 | Franklin et al. ............ 709/229 |
| 6,108,788 | A | * | 8/2000 | Moses et al. ............... 713/201 |
| 6,128,740 | A | * | 10/2000 | Curry et al. ................ 713/200 |
| 6,138,239 | A | | 10/2000 | Veil ............................ 713/200 |
| 6,148,290 | A | * | 11/2000 | Dan et al. ...................... 705/1 |
| 6,202,157 | B1 | * | 3/2001 | Brownlie et al. ........... 713/201 |
| 6,381,639 | B1 | * | 4/2002 | Thebaut et al. ............. 709/222 |
| 6,510,513 | B1 | * | 1/2003 | Danieli ....................... 713/156 |
| 2002/0169954 | A1 | * | 11/2002 | Bandini et al. ............. 713/153 |

FOREIGN PATENT DOCUMENTS

| | | |
|---|---|---|
| EP | 0465016 | 1/1992 |
| EP | 0813132 A2 | 12/1997 |
| EP | 0828208 A2 | 3/1998 |
| WO | WO98/58306 | 12/1998 |

OTHER PUBLICATIONS

Greck et al., "Overview of Certification Systems: X.509, CA, PGP and SKIP," Aug. 1, 1998, MCG, pp 1–18.
Karlton, Phil, "Proposal to add attribute certificates to TLS 3.1," Jul. 26, 1996, pp 1–2.
Housley et al., "Metering: A Pre–Pay Technique", SPIE vol. 3022, Feb. 13, 1997, pp. 527–531.
Hsu, Yung–Kao, "Development of an Intranet Security Infrastructure and Its Application," IEEE Comput. Soc. Proceedings of Wet Ice '98 —IEEE Seventh International Workshop on Enabling Technologies: Infrastructure for Collaborative Enterprises, Jun. 17–19, 1998, pp. 334–339.
Grimm, Rudiger et al., "Security policies in OSI–management experiences from the DeTeBerkom project BMSec," Computer Networks and ISDN Systems, vol. 28, No. 4, Feb. 1, 1996, pp. 499–511.
Lopez, Lourdes et al., "Hierarchical Organization of Certification Authorities for Secure Evironments,"IEEE Computer Soc. Press. Proceedings of SNDSS '97: Internet Society 1997 Symposium on Network and Distributed System Security, Feb. 10–11, 1997, pp. 112–121.

* cited by examiner

*Primary Examiner*—Norman M. Wright

(57) ABSTRACT

A programmable policy module (PPM) allows a user to configure specific policy elements available from a software application, in order to meet a particular assurance level. The policy will then be enforced by the PPM to meet a target set of policy requirements. In one embodiment, the PPM provides the linkage between the certificate policy identified in an X.509 certificate extension, and the execution of a module that enforces the specific policy elements during the process of digital certificate registration. The PPM can execute at the Registration Authority (RA) in a Public Key Infrastructure (PKI), and can permit enforcement of the policy elements in the Certificate Policy (CP) which governs the operations of the RA.

42 Claims, 16 Drawing Sheets

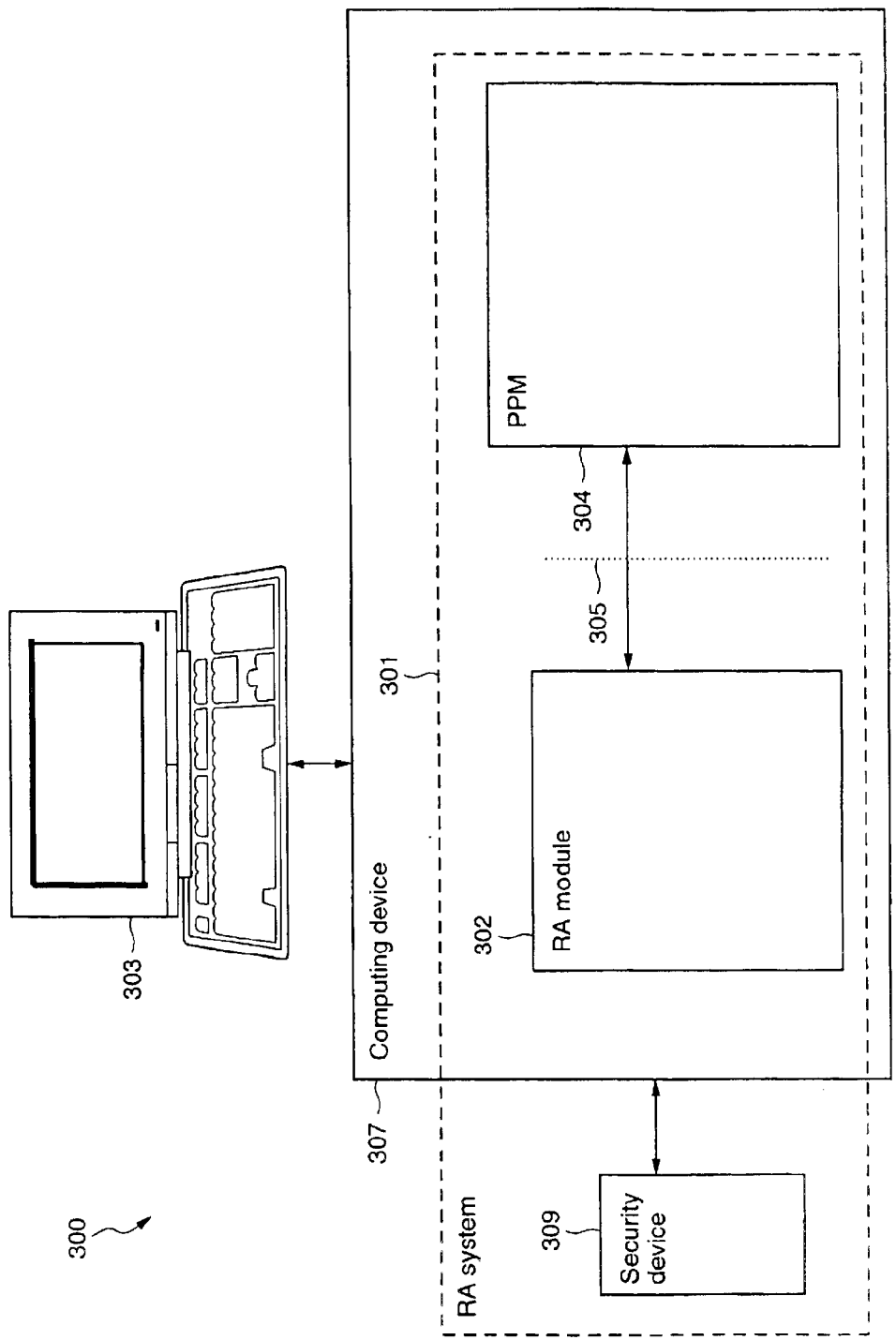

| Name/description of policy | SPYRUS Business |
|---|---|
| Policy OID (text) | 1.2.36.84092795.1.1.0.2 |
| Policy OID (binary) | 2A 24 A8 8C CE 7B 01 01 00 02 |
| Interface pointer | [32 bit memory address] |
| Permitted operations | Issue card certificate<br>Issue email certificate<br>Issue PKCS 10certificate<br>Renew card certificate<br>Update user information<br>Revoke certificate<br>Change PIN<br>Key Recovery<br>Initialize card |

Fig. 4b

Identification

- Personal — 662
  - 670 — ☑ Driver's License     674 — ☐ Credit Card
  - 672 — ☑ Passport              676 — ☐ Personal Knowledge

- Badge — 680
  - ☑ Organisation     ☐ Government

- Biometrics — 682
  - ☑ Thumb     ☐ Voice     ☐ Face     ☐ Retina

- Documents — 684
  - ☐ Articles of Incorporation     ☐ Company Seal
  - ☐ Notarized Document

[ < Back ]  [ Finish ]  [ Cancel ]  [ Help ]

| Contact Details | | |
|---|---|---|
| Registration File 732 | | |
| Hardware.txt | | Load... 734 |
| 736 — Name: 738 | | |
| Mac Address: 0080C82750F4 740 | | |
| Card ID: 000000009D414871 742 | | |
| LicenceType: | Maintaince | 744 |
| Operation Type: | Organisational | 745 |
| Product: | Certificate Authority | |
| Subscribers | Subordinates | Domains |
| 1000 | 50 | 3 |
| Valid From — 746 | Valid To — 748 | 750 |
| 1999/05/28 | 2001/05/28 | |

[ < Back ] [ Finish ] [ Cancel ] [ Help ]

Fig. 7c

METHOD AND SYSTEM FOR A POLICY ENFORCING MODULE

BACKGROUND OF THE INVENTION

1. Field of the Invention

The present invention relates to enforcement of policy requirements by a component of a communications infrastructure. More particularly, the present invention relates to automated enforcement of policy requirements in a public key infrastructure component via a policy enforcing module.

2. Background Information

In general, a communications infrastructure component can be any physical or logical entity that plays a role in the operation of that communications infrastructure. For example, in a distributed data processing network such as the Internet, a communications infrastructure component can include such entities as an Internet Service Provider (ISP), a network server, or a network router. In the particular case of a public key infrastructure (PKI), a communications infrastructure component can include a PKI component. A PKI component can perform many different operations including, but not limited to, distributing, managing, revoking, issuing, certifying, or cross-certifying certificates, or any other operations related to certificate management.

The deployment of public key cryptography, especially in a PKI, relies heavily on certificates. A certificate contains the public key of a user (or end entity), along with information that can allow a relying party to evaluate whether or not to trust a user's digital signature produced using the private key corresponding to that public key. In particular, the certificate contains the digital signature of a Certification Authority (CA).

In a PKI, a CA issues certificates to end entities. In general, the CA is a secure, standards-based, and trusted entity that can provide certificate issuance, token management, and directory management services. A CA's digital signature on a certificate indicates that the CA has verified the identity of the user whose certificate it has signed, and the CA's digital signature also binds the identity of the user to the public key appearing in the certificate.

In order to provide trust to all parties in a PKI involved in electronic transactions which use certificates, policies made up of one or more requirements can be established and followed covering all aspects of the operation of the PKI. These policies can, for example, be followed by a CA. In addition, any subordinate entities in the PKI, such as a Registration Authority (RA), may also need to follow those policies. The policies of the PKI are documented as a collection of requirements or policy elements in a document known as a Certificate Policy (CP). The CA and RA can then enforce the particular policy according to those policy elements via their practices and procedures. The practices and procedures employed by the CA and RA in enforcing the CP are documented in a Certification Practice Statement (CPS). A de facto standard for both the CP and CPS has been established and is known as the PKIX Part 4 framework. The framework provides a checklist of policy elements applicable to a PKI component which should be addressed in the CP and CPS. Many of these policy elements relate to the technical aspects of the PKI which can be enforced in various PKI components. Some examples of policy element categories from the PKIX Part 4 framework which are related to technical aspects of the PKI include key pair generation, key sizes, key usage purposes and authentication of individual identity.

The United States Department of Defense (DoD), in its X.509 Certificate Policy (CP), Version 2.0, dated 1999 March, contains many policy elements. For example, section 6.1.5 of the DoD CP titled "Key Sizes" contains the following policy element: "DSS keys issued by a US DOD CMI shall use 160 bit private key (x) and 1024 bit prime modulus (p). Minimum user public keysizes shall be 1024 bits for KEA and RSA." Also, section 3.1.9 of the DoD CP titled "Authentication of Individual Identity" contains the following policy element: "For CLASS 4, the user must appear personally before a [Certificate Management Authority], and two credentials must be presented. One must be an official picture ID, such as a passport or DOD ID card; the other may be specified by the program which requires the user to have the certificate."

In general, a policy identifier can be any data item which unambiguously identifies a particular policy. As defined in the X.509 standard of the International Telecommunication Union (dated June 1997), an X.509 certificate can contain a certificate policies extension as part of the certificate extensions. The certificate policies extension is an example of a policy identifier since it lists the certificate policy object identifiers, each of which identifies a particular CP, which the issuer authorizes and which apply to the certificate. The X.680 standard of the International Telecommunication Union (dated July 1994), provides the standard notation for these certificate policy object identifiers.

In addition to a policy identifier, optional qualifier information can be included which pertains to these certificate policies. According to the X.509 standard, "[t]ypically, different certificate policies will relate to different applications which may use the certified key" and "[c]ertificate policies and certificate policy qualifier types may be defined by any organization with a need".

In the past, RAs did not exist at all, and even when they did, the automated imposition of policy constraints did not occur. Furthermore, no technology currently exists with the ability to automate enforcement of technical aspects of a policy in a PKI.

For example, U.S. Pat. No. 5,164,988 to Matyas describes a "Method to Establish and Enforce a Network Cryptographic Security Policy in a Public Key Cryptosystem." The Matyas invention focuses on the security practices of the end entity (i.e. the recipient of the certificates), based on an overall security policy for the network. Thus, the Matyas invention only addresses the actions in the communications infrastructure which occur after the issuance of a certificate. It does not address the automated enforcement of policy during the certificate issuance process, nor does it address the role of RAs in the certificate issuance process.

In addition, various PKI implementations may have differing requirements which must be enforced by the CA and RA. For example, the validity period for a certificate in a particular PKI might be one year. However, an entity that implements a high assurance CA that issues certificates in that particular PKI may desire to further restrict the validity period to, for example, the month. The ability to further restrict the validity period might not be a standard feature of the CA or RA in the example PKI.

In order to automate policy enforcement, policy enforcing modules are needed which will allow a customized solution for a particular PKI. Without such a module, the varying requirements between different PKIs would make the implementation of a CA or RA large and cumbersome. In addition, CA or RA operators would be unable to further modify or tailor policy requirements to their specific needs.

Furthermore, implementers of new PKIs might decide to sacrifice security or to weaken other requirements in order to conform with existing features in a CA or RA. A policy enforcing module would overcome these problems.

SUMMARY OF THE INVENTION

During deployment of a policy enforcement system, a policy implementer can configure the policy elements to be enforced by a communications infrastructure component via a policy enforcing module. In particular, the Programmable Policy Module (PPM), one type of policy enforcing module available in the S2CA, a CA product made by SPYRUS, Inc. of Santa Clara, Calif., can provide the ability to configure and enforce policy. The PPM assists in the enforcement of the policy elements selected in order to meet one or more target policies.

In one embodiment, a PPM can provide a linkage between the policy elements in a certificate policy (CP) identified in the policy extension of the X.509 certificate of a PKI component, and a system that enforces that policy during operations involving a certificate. A PPM can execute at a PKI component and can enforce the policy elements in a CP which defines policies governing the entities within a PKI.

It is an object of the present invention to provide a method for linking policy data and the execution of a module that enforces specific policy elements. It is a further object of this invention to allow an integrator to customize the specific policy elements in order to provide a high assurance product to enforce specific policies. Another object of this invention is to provide a system which will allow enforcement of core policy requirements by a generic PKI component, while also allowing enterprise specific policy requirements to be enforced by a policy enforcing module.

BRIEF DESCRIPTION OF THE DRAWING

FIGS. 3a–3b are a block diagram showing the basic structure of the RA module and the PPM.

FIG. 4b depicts the information that can be contained in policy information table.

FIG. 6a through FIG. 6d are examples of a number of property pages associated with a property sheet which is displayed to a RA operator when a card certificate is requested.

FIG. 7a through FIG. 7c are examples of a number of property pages associated with a property sheet which is displayed to a RA operator when an attribute certificate is requested.

DETAILED DESCRIPTION OF THE INVENTION

Figure 1:
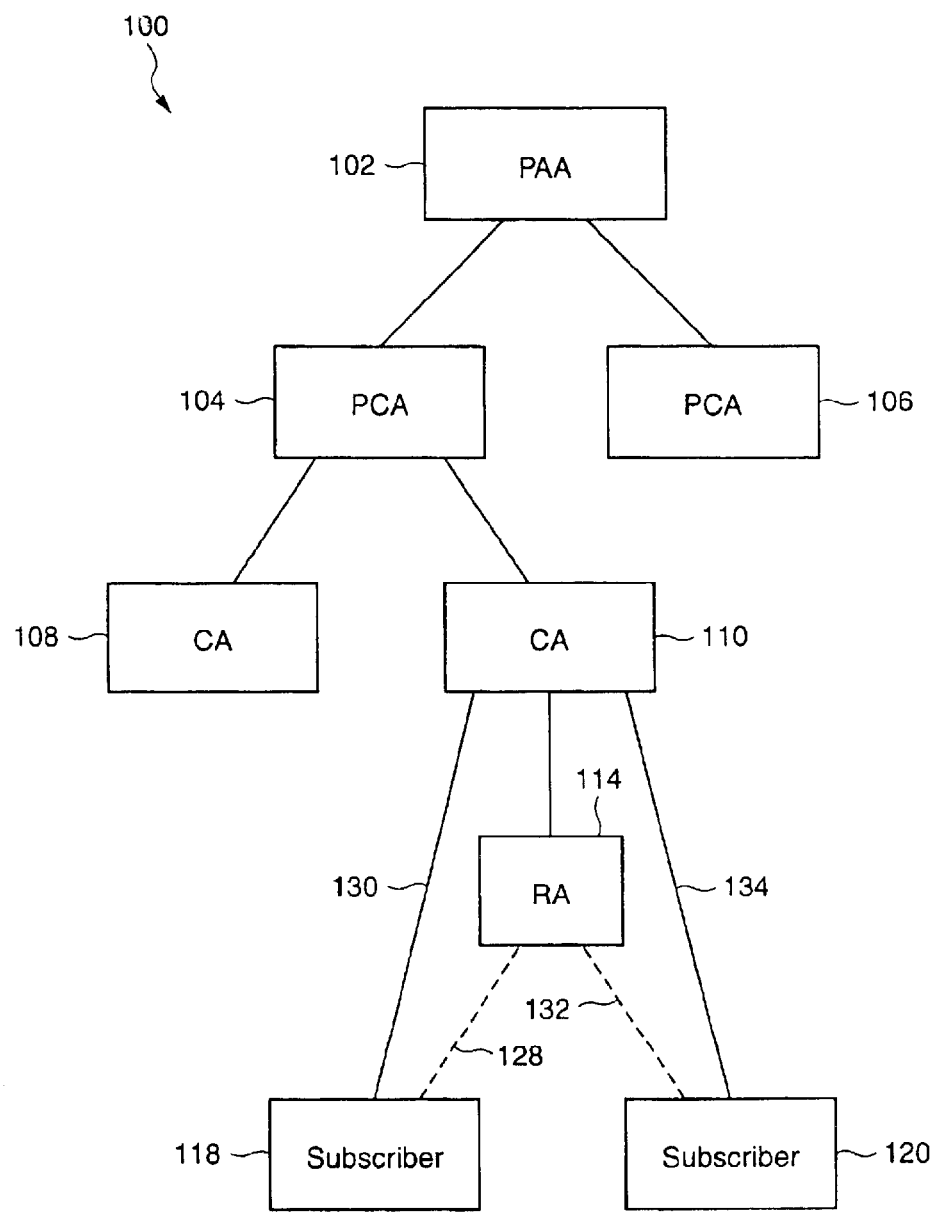
FIG. 1 is a block diagram of a communications infrastructure for facilitating public key deployment, also known a Public key infrastructure.

A public key infrastructure (PKI) can consist of four communications infrastructure components: a Policy Approving Authority (PAA), a Policy Creation Authority (PCA), a Certification Authority (CA), and a Registration Authority (RA). These components can be deployed in a hierarchical manner, as illustrated in FIG. 1. Each of the communications infrastructure components in FIG. 1 is an example of a PKI component.

The hierarchy for the S2CA suite of security solutions, built and sold by SPYRUS, Inc. of Santa Clara, Calif., can establish a trusted root at the PAA level, and can allow the creation and deployment of multiple subordinate PCAs to support an environment where multiple policies are defined. For example, as shown in FIG. 1, PAA 102 could be established as the trusted root in PKI 100. Once PAA 102 has been established, PCA 104 and PCA 106 could be created and deployed as subordinate entities to PAA 102.

Once a PCA is deployed, one or more CAs subordinate to the PCAs can be created and deployed to issue certificates in accordance with policies created by the PCA. As shown in FIG. 1, CA 108 and CA 110 can be created and deployed under PCA 104 in PKI 100. Once CA 110 is properly established, RA 114 can be created and deployed subordinate to CA 110. If necessary, RAs can be deployed in the users' environments. In FIG. 1, RA 114 can be responsible for validating the identity and any necessary authorizations of end entities 118 and 120. Once this information has been validated, a RA can generate a secured certificate request to a CA. A RA can also be responsible for performing any token management functions for a user, such as, for example, card initialization and PIN changing. As shown in FIG. 1, while end entity 118 communicates with RA 114 over communications path 128, and entity 118 is actually subordinate to CA 110, via certification path 130. Certifiation path 130 is established by the digital signature of CA 110 on the certificate of end entity 118.

As discussed above, an S2CA can support a distributed PKI environment where the certificate issuing and policy management functions are centralized, but the issuing and token management functions are localized in the customer's organization. A PPM, in accordance with the invention, facilitates policy enforcement wherever appropriate in the PKI.

Figure 2:
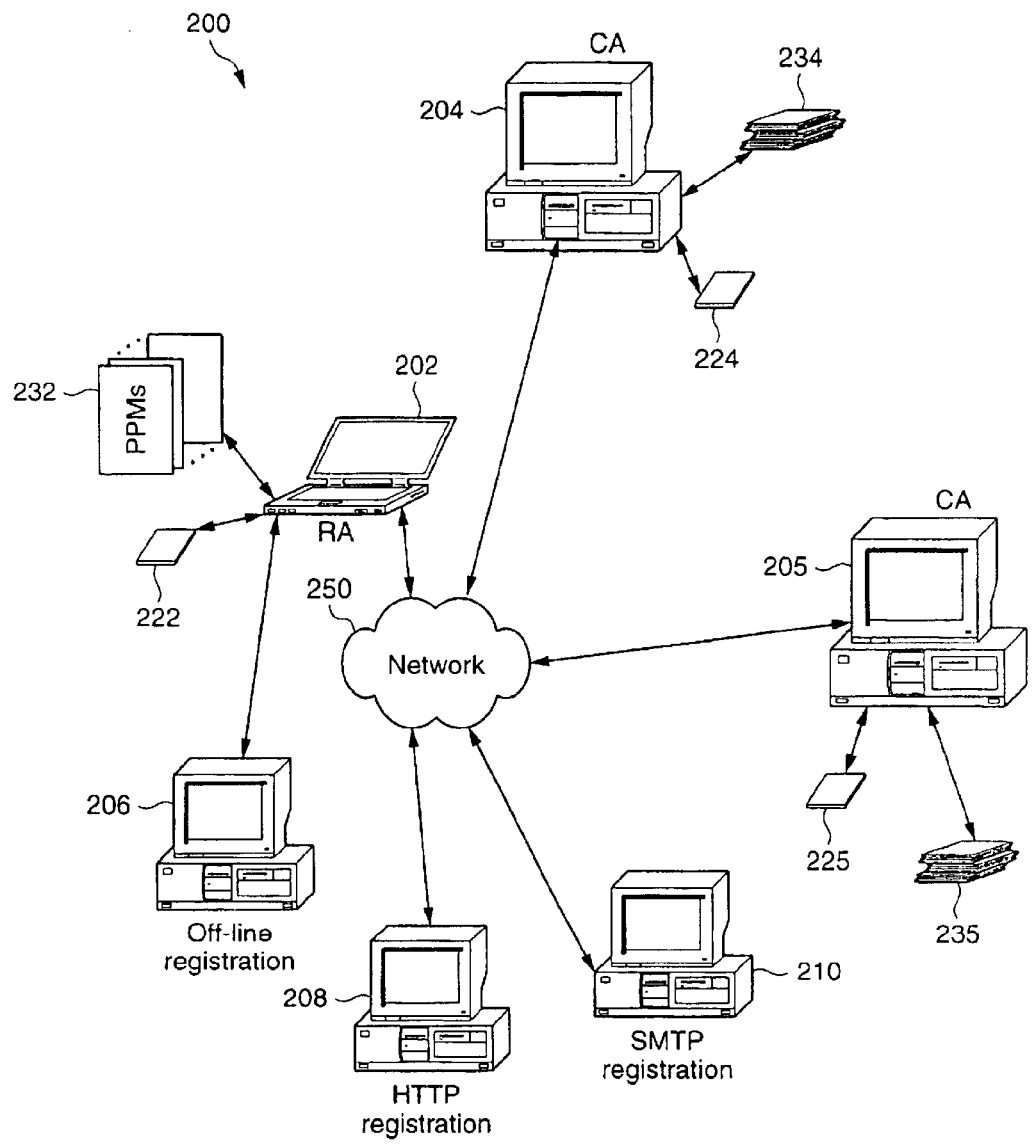
FIG. 2 depicts one example of a PKI architecture.

An example of one S2CA architecture, incorporating a PPM at the RA, is shown in FIG. 2 which depicts several PKI components in PKI 200 communicating over network 250. PKI 200 can include RA 202, CA 204 and CA 205, each of which is a PKI component. Other PKI components in PKI 200 can include several different request mechanisms, including off-line requests 206, HTTP requests 208, and SMTP requests 210.

RA 202 in FIG. 2 contains one or more PPMs 232 and cryptographic token 222. Cryptographic token 222 can enable RA 202 to communicate in a secure and authenticated manner with the other PKI components within PKI 200. The PPMs installed in RA 202 allow it to enforce the policies which are identified in the policy extension in its X.509 certificate. The policy could be specified in a CP, such as CP 234 or CP 235.

Upon receiving a request to issue a certificate from a registration mechanism (such as, for example, off-line request 206, HTTP request 208, or SMTP request 210), RA 202 can select the particular PPM from those loaded corresponding to the policy for the certificate being requested. In FIG. 2, for example, a request to issue a certificate from CA 205 can be received by RA 202 over network 250 from HTTP request 208. RA 202 can enforce the policy of CA 205 contained in CP 235 by loading the PPM corresponding to CP 235.

The present invention includes a method and system for configuring and enforcing policy within a PKI component. FIG. 3a depicts RA 300, which is an example of a PKI component. In this embodiment, RA 300 can include operator interface 303, computing device 307, and security device 309. Operator interface 303 can include any arrangement of one or more interface elements that communicate with the human operator of the PKI component, including, but not limited to, a visual display, a keyboard, a mouse, or an audio unit.

Computing device 307 in this example of a RA contains RA system 301. Some examples of a computing device include a personal computer, a personal digital assistant, or a machine with embedded computing capability. In general, computing device 307 represents any equipment used by a person or other entity (such as a corporation) that contains at least one computing application. In some embodiments, operator interface 303 can be an integral part of computing device 307 (as in the case of, for example, a notebook or laptop computer). In other embodiments, operator interface 303 may be separate from computing device 307 (as in the case of a personal computer). In further embodiments, operator interface 303 may even be physically located at a different location than computing device 307.

Security device 309 can include cryptographic tokens, such as the LYNKS PCMCIA card designed and produced by SPYRUS, Inc. of Santa Clara, Calif. In other embodiments, security device 309 can include a smart card, such as the Rosetta smart card also designed and produced by SPYRUS, Inc. of Santa Clara, Calif.

In general, an operator of RA 300 can perform a number of different functions in a PKI. In particular, RA system 301 can provide the registration functionality for end entities in a PKI. In a PKI utilizing one embodiment of the invention, a potential end entity first makes itself known to a CA through a RA, prior to that CA issuing a certificate or certificates for that potential end entity. Registration can involve the potential end entity providing its name (e.g., common name, fully-qualified domain name, or IP address), and other attributes to be put in the certificate, followed by the CA (possibly with help from the RA) verifying in accordance with the CPS that the name and other attributes are correct.

In one embodiment, RA module 302 contained within RA system 301 provides this registration functionality by communicating with PPM 304 over logical PPM interface 305. Logical PPM interface 305 defines services the PPM 304 must supply to the RA module 302. The interface definition can include but is not limited to methods of data exchange; definition, semantics and valid values of data structures; the definitions of the functions, methods or commands; the parameters for those functions, methods, or commands; and the syntax, semantics and valid values of the parameters.

An interface command can be any instruction the RA module 302 passes across PPM interface 305 to PPM 304 to perform some activity. The activities can includes but are not limited to, supplying specific or general data, entering or exiting a particular state, or performing a task. In one embodiment in a SPYRUS S2CA, the interface command set can comprise the functions GetDescription 330, GetErrorMessage 332, GetParameter 334, GetPropertyPages 336, Completepropertypages 338, RAOpenOperation 340, RACloseOperation 342, CAOpenOperation 344, and CACloseOperation 346. In other embodiments, the interface command set could comprise a set of protocol data units transmitted over data communication lines. RA module 302 can also communicate with the RA operator via operator interface 303.

In general, RA module 302 contains the general purpose functions of the particular PKI component. In one embodiment, RA module 302 of RA system 301 can enforce the mandatory requirements, while PPM 304 can enforce the discretionary requirements of the policy. Mandatory requirements can include several elements, including, but not limited to, those elements relating to end entity common name entry, validity period entry, key usage extension, and policy extensions. Discretionary requirements can be documented as policy elements specified in the CP identified by the Certificate Policies extension of the X.509 certificates issued by the parent CA in this PKI. Examples of policy elements documenting specific discretionary requirements of the PKI which PPM 304 can enforce include key algorithm, key usage value, and the acceptable types of identification used to prove end entity identity. In each of these examples, entry refers to the process of the RA operator entering the appropriate information into RA system 301 via operator interface 303.

Figure 3B:
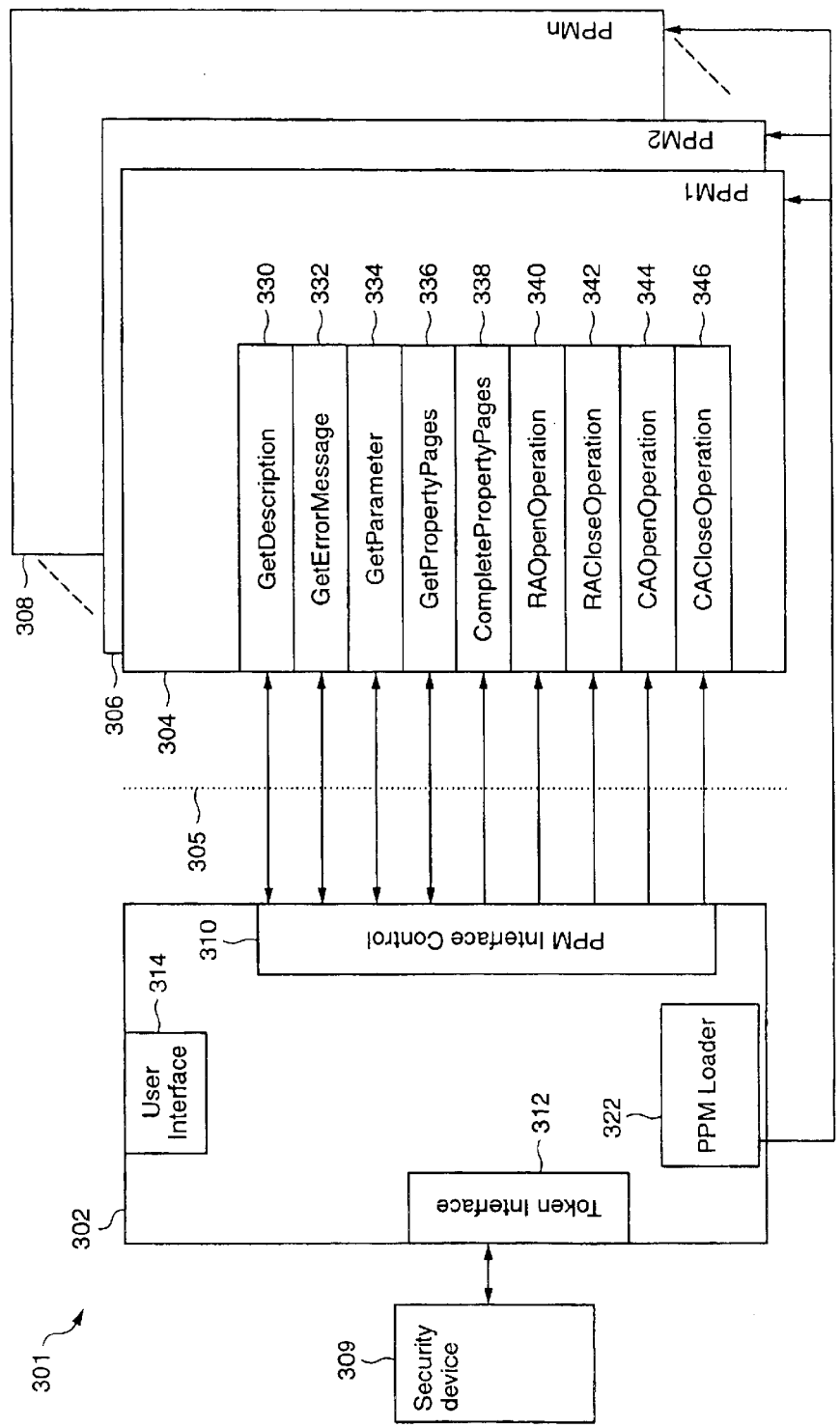

Referring to FIG. 3b, one embodiment of the present invention includes one or more PPMs 304, 306, and 308 which execute in conjunction with RA module 302 in a PKI component. PPMs 304, 306, and 308 can include, for example, a computer memory programmed with instructions for execution by a computer processor, one or more logic devices, a custom programmed application specific integrated circuit (ASIC), or any other types of devices which provide computing capability.

The overall RA system 301 can operate as follows: RA module 302 communicates with PPMs 304, 306, and 308 over instances of logical PPM interface 305. RA module 302 includes PPM interface control 310, token interface 312, user interface 314, and PPM loader 322.

PPM interface control 310 can provide control over the communications between RA module 302 and PPM 304. This can include sending commands and receiving status from PPM 304.

Token interface 312 can handle the operations which involve security device 309. This can include sending commands to and receiving status information from security device 309.

User interface 314 can control the exchange of data with operator interface 303 in RA 300 via RA system 301. This could include, for example, sending status and error messages from user interface 314 to operator interface 303, and receiving commands and inputs from operator interface 303.

When the RA is activated, PPM loader 322 can load all PPMs that are both listed in the Policy extension of the RA's X.509 certificate and installed on the computing device 307.

In logical PPM interface 305, the four administrative functions RAOpenOperation 340, RACloseOperation 342, CAOpenOperation 344, and CACloseOperation 346 initiate and terminate specific operations between RA module 302 and PPM 304. The RAOpenOperation 340 and CAOpenOperation 344 functions can, for example, Initialize the data exchange channel of logical PPM interface 305 between RA nodule 302 and PPM 304. In one embodiment, this would set up pointers to the memory which makes up the data exchange channel of logical PPM interface 305.

GetDescription 330 supplies a textual description of the policy to be displayed to the RA operator. For example, the SPYRUS Business Certificate Policy can have an OID of 1.2.36.84092795.1.1.2, which can be broken out as corresponding to {iso(1) member-body(2) Australia (36) SPYRUS (84092795) CMI (1) Certificate Policies(1) Business(2)}. In this example, an OID of 1.2.36.84092795.1.1.2 corresponds to the textual description of "Spyrus Business"

RA module 302 can invoke GetErrorMessage 332 when PPM 304 returns an error. In response, GetErrorMessage 332 returns to RA module 302 a text description of any errors which occur in PPM 304.

If RA module 302 invokes GetParameter 334, PPM 304 can return the value of the particular parameter specified by RA module 302. The parameters returned by the PPM will correspond to specific values for policy elements, and can include, for example, the default validity period for the certificate, the certificate versions or the types of cryptographic tokens supported.

The invocation of GetPropertyPages 336 by RA module 302 in this embodiment causes PPM 304 to configure the policy property pages, which are the particular type of data entry windows used in this embodiment. PPM 304 then supplies to RA module 302 all of the property pages that PPM 304 requires to be displayed in the property sheet of RA module 302. Generally, a property sheet is a particular collection of data entry windows.

Similarly, invocation of CompletePropertyPages 338 by RA module 302 in this embodiment causes PPM 304 to complete the operation begun by the invocation of GetPropertyPages 336. FIG. 6 and FIG. 7 and their accompanying description provide further detail on the display of property pages in property sheets.

When input received at user interface 314 causes selection of the RA role, the RA will cause PPM loader 322 to load all the PPMs identified in the RA certificate and available on computing device 307. See FIG. 4a for further detail on this process. Once the PPMs have been loaded, the user interface 314 presents a list of PPMs available. PPM interface control 310 handles communications with PPM 304 over logical PPM interface 305. In response to further input from user interface 314, the RA can generate appropriate commands for PPM 304 and manage the responses received over logical PPM interface 305.

Figure 4A:
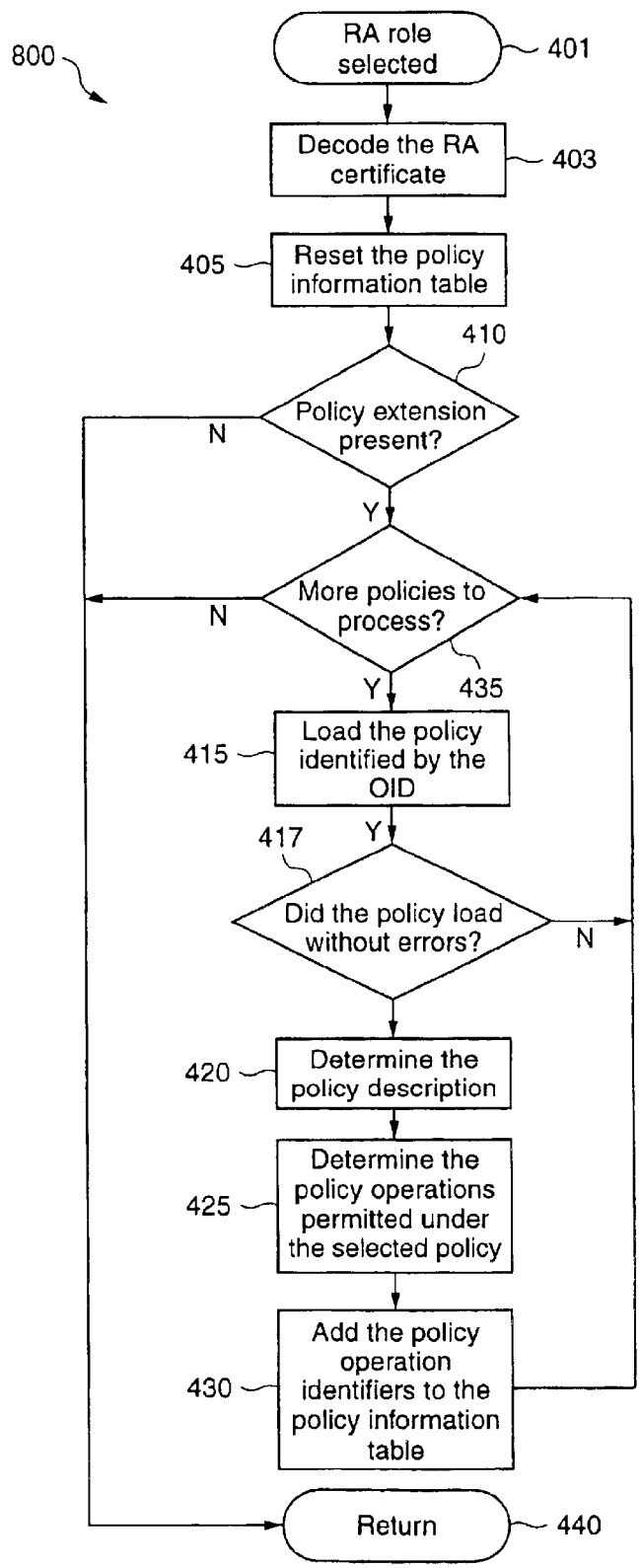
FIG. 4a is a flow chart depicting the process which occurs when a user selects the RA role via the S2CA.

FIG. 4a depicts the process 400 which occurs in RA module 302 for handling the selection of the RA role by the user via the S2CA software in one embodiment of the present invention. When the RA role is selected 401 and the RA certificate is decoded in step 403, the reset step 405 in the process resets a user policy information table. A user policy information table can provide RA module 302 with access to frequently used information on the specific policies available to it.

A user policy information table can, for example, include a name for a policy, a binary form of the object identifier (OID), a text version of the OID, and a set of flags which indicate which request operations the RA can perform. FIG. 4b provides an example of a user policy information table entry.

The reset of the user policy information table in step 405 in FIG. 4a provides a known initial state upon which a new user policy information table will be built for the immediate session. The next step 410 determines whether a policy extension is present and, if note, passes control to step 440. Once step 410 has been completed, a loop is begun to process each policy designated in the RA's certificate. If further policies need to be processed based on the decision in step 435, control is passed to step 415. In step 415, the PPM identified by the next policy OID in the policy extension is loaded. If the PPM loads without errors as decided in step 417, control is passed to step 420; otherwise, control is passed to the head of the loop at step 435. In step 420, the policy description is loaded. In step 425, the RA request operations permitted under the policy are loaded. From information obtained in steps 415, 420 and 425, an entry in the user policy information table is populated in step 430. Control is then passed to the head of the loop at step 435.

FIG. 4b provides a graphical depiction of the information that can be contained in a user policy 30 information table. The user policy information table in FIG. 4b contains the settings which correspond to the "Spyrus Business" policy.

Figure 5:
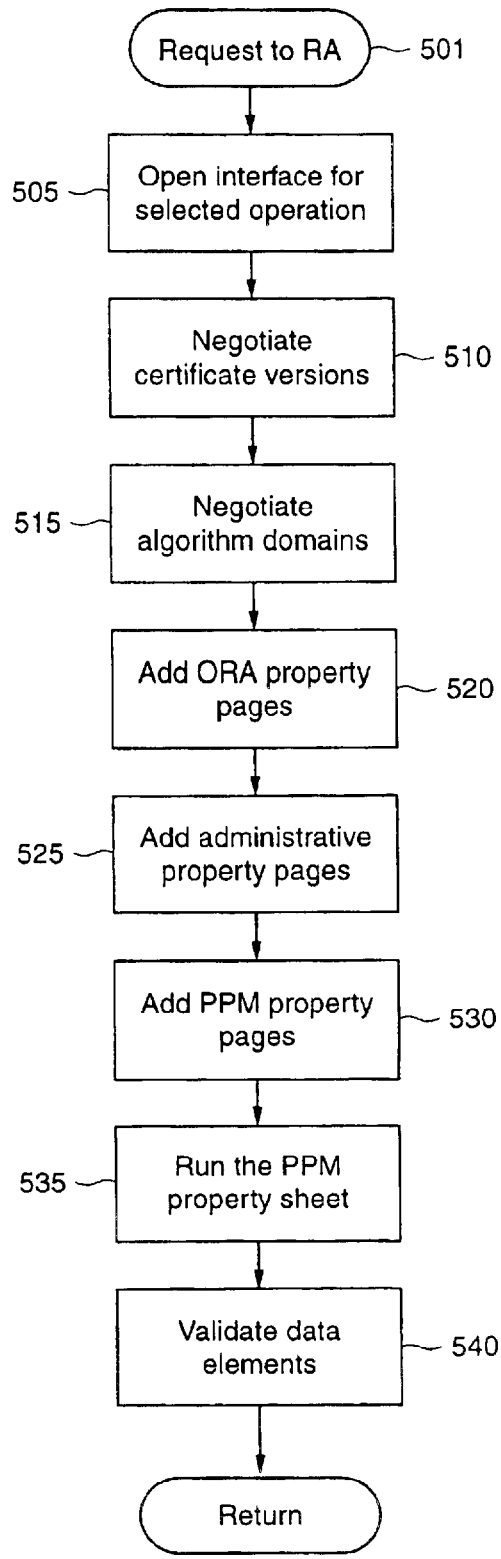
FIG. 5 is a flow chart depicting the process which occurs when a request requiring policy enforcement is made to the RA via the S2CA software.

The flow chart in FIG. 5 depicts a typical process which occurs when the RA operator initiates a request in one embodiment of the present invention. Before any policy-related operations are performed, the RA operator must ensure that the desired policy is selected. When a request to the RA 501 from the RA operator is received, an interface is opened for the selected operation in step 505. The RA notifies the PPM to open the interface for the specified operation. To open the interface, the RA supplies the operation identifier and the necessary pointers to the common data structures which will be used for transferring data between the RA and the PPM.

Once the PPM opens the interface, the RA negotiates with the PPM in step 510 the versions of the certificates which are supported by the operation selected in request step 501. In one embodiment, the RA sets those versions which it supports, and the PPM resets those versions which it does not support. If any errors occur during this step, the operation will be terminated by the RA and an error reported. This could occur, for example, if the RA and the PPM have no versions in common which they support. This processing can also prevent any security breaches caused by a PPM trying to circumvent the RA by, for example, setting a version that the RA has not set.

In a similar fashion, the RA negotiates with the PPM in step 515 the algorithm domains which are supported by the operation selected in request step 501. In one embodiment, the RA sets those domains which it supports, and the PPM resets those versions which it does not support. If any errors occur during this step, the operation can be terminated by the RA and an error reported. This could occur, for example, if the RA and the PPM have no domains in common which they support. This processing can also prevent any security breaches caused by a PPM trying to circumvent the RA by setting a domain that the RA has not set.

As long as the RA and the PPM successfully negotiate both the certificate versions and the algorithm domains in steps 510 and 515 respectively, the RA initializes one or more of its property pages and adds them to the property sheet in step 520.

In step 525, the administrative property pages are added. The PPM property pages are added in step 530. This occurs as a result of RA module 302 calling the PPM interface function GetPropertyPages 336 of, for example, PPM 304.

In step 535, RA module 302 can cause the display of the property sheet o the RA operator over operator interface 303 (as described further with respect to FIG. 6 and FIG. 7). The RA operator can then enter or edit the data items in any property page. When a RA property page is active, RA module 302 has control and when a PPM property page is active, PPM 304 (in this example) has control. When a PPM property page becomes inactive, the data collected by the page is placed on the data exchange channel in accordance with definition of the logical PPM interface 305. When the RA operator exits the property sheet, RA system 301 instructs PPM 304. (in this example) to complete any outstanding tasks needed to operator interface 303.

In step 540, RA module 302 of RA system 301 checks the elements returned on the data exchange channel of the logical PPM interface 305 to verify that the PPM has not removed mandatory elements (for example, the policy extension), changed preset values (for example, the policy OID), or set variables outside the allowed limits (for example, those of the validity period).

FIG. 6a through FIG. 6d depict the property pages associated with the property sheet that can be displayed when a card certificate is requested while using the SPYRUS S2CA. However, a PPM can be used for enforcing policy elements of any type of application which requires policy enforcement. The PPM, which was invoked by its linkage to the policy designated in the policy extension of the X.509 certificate, determines which of the fields shown in FIG. 6c through FIG. 6d must be completed by the operator (i.e. mandatory), those which may or may not be completed by the RA operator (i.e. discretionary), or those which cannot be entered by the RA operator (i.e. prohibited).

Figure 6A:
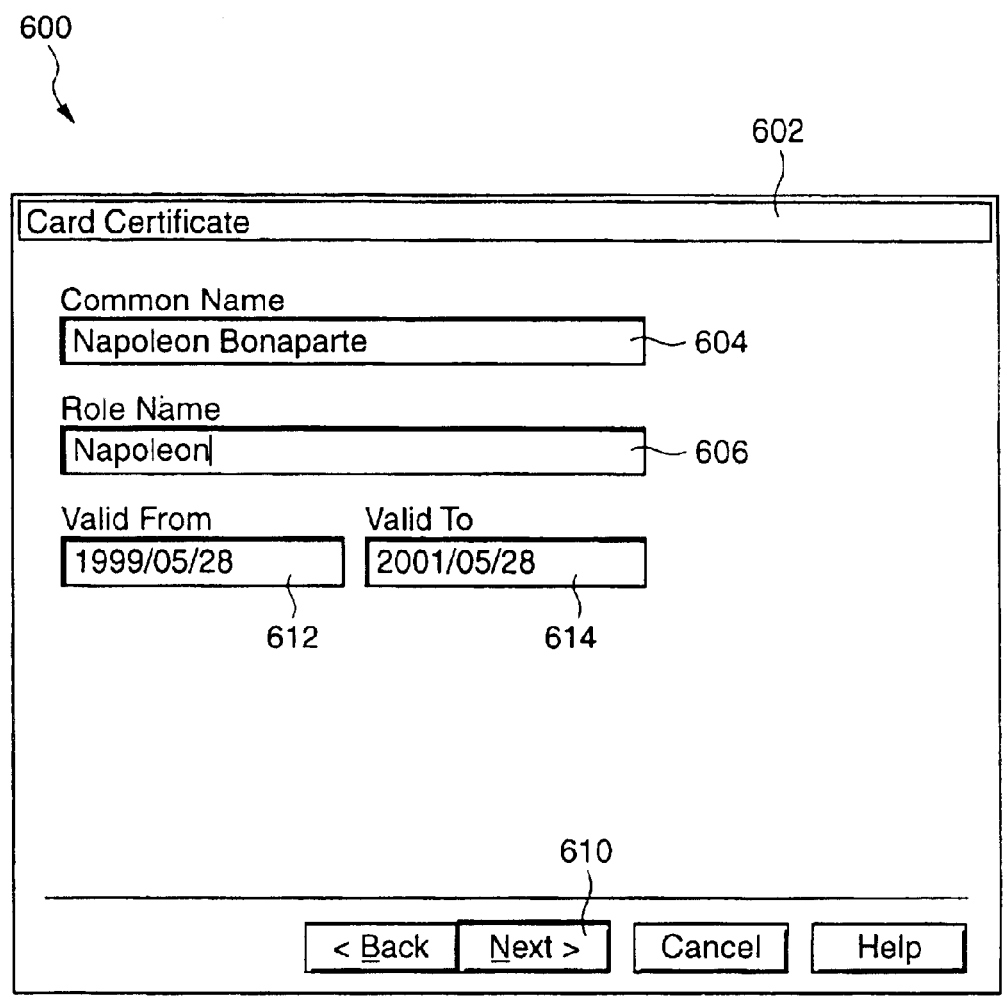

FIG. 6a is a screen shot of one embodiment of a property sheet 600, which is displayed to the RA operator when a card certificate is requested. One embodiment of a Card Certificate property page 602, supplied by RA module 302, contains entries for the RA operator to supply information about the end entity. When the Next button 610 is pressed, the property sheet advances to the Admin property page 625.

Figure 6B:

FIG. 6b depicts one embodiment of Admin property page 625, supplied by RA module 302. Admin property page 625 allows the RA operator to enter additional information about the recipient of the certificate. When the Next button 610 is pressed, the property sheet advances to the Key Information property page 640.

Figure 6C:
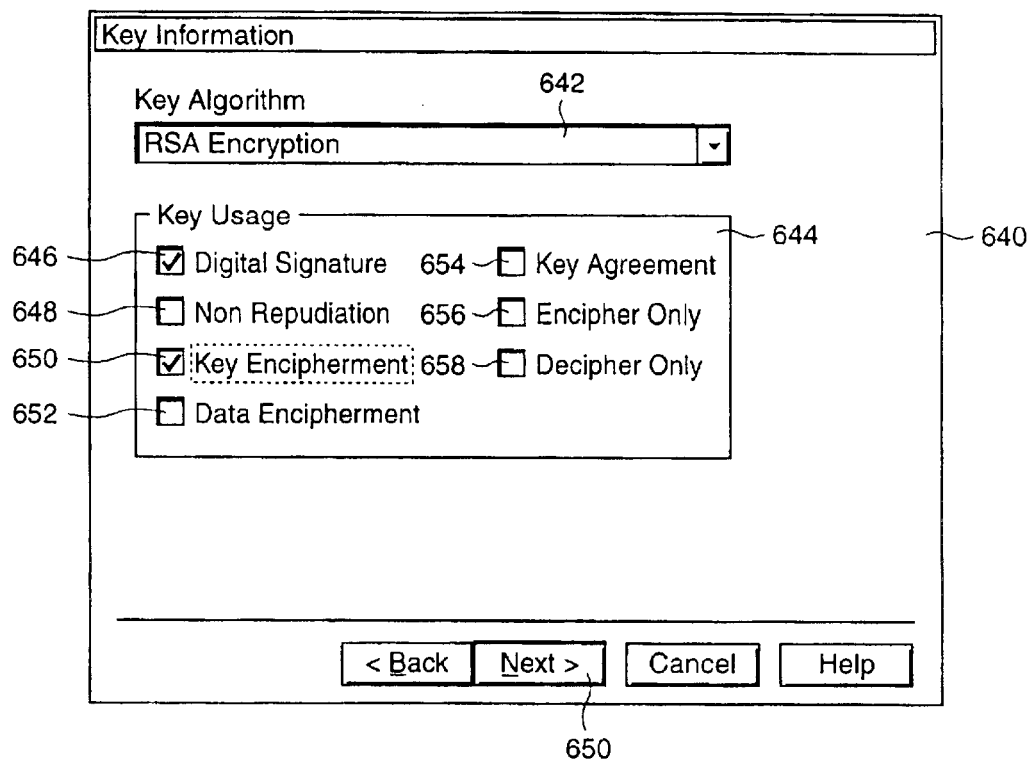

FIG. 6c depicts one embodiment of Key Information property page 640, which can be supplied by PPM 304. Key Information property page 640 allows the RA operator to enter algorithmic information about the key pair related to the certificate which can be generated by the RA for the end entity. Key Information property page 640 contains a Key Algorithm drop down combo box 642 which allows the RA operator to select the algorithm applicable to the certificate being created for the end entity. In this particular embodiment, the choice of the RSA Encryption algorithm in Key Algorithm drop down combo box 642 allows the RA operator certain choices in Key Usage selection box 644 while disabling other choices. For example, the RA operator may choose to select such options as Digital Signature 646, Non Repudiation 648, Key Encipherment 650, or Data Encipherment 652. However, other options are "grayed out" in this example, such as Key Agreement check box 654, Encipher Only check box 656, and Decipher Only check box 658. Here, "graying out" refers to the display of inaccessible items in a contrasting color from those that are accessible.

In the example shown in FIG. 6c, the RA operator has made choices that will allow the key pair to be used for applying digital signatures and for encrypting keys using the RSA encryption algorithm. The particular policy being enforced by the PPM in this example permits the same key to be used for digital signatures and encryption. However, a different key algorithm might require the two operations to be mutually exclusive. In this case, choosing the different algorithm in Key Algorithm drop down combo box 642 would result in all four Key Usage choices of Digital Signature 646, Non Repudiation 648, Key Encipherment 650, and Data Encipherment 652 available but not selected. Once the RA operator selects either Digital Signature box 646 or Non Repudiation box 648 (i.e. a certificate for generating digital signatures), Key Encipherment box 650 and Data Encipherment box 652 would be "grayed out" and thus made unavailable to the RA operator. Similarly a selection of Key Encipherment box 650 or Data Encipherment box 652 cause Digital Signature box 646 and Non Repudiation box 648 to be "grayed out" and thus made unavailable to the RA operator. When the Next button 610 is pressed, the property sheet advances to the Identification property page 660.

Identification property page 660 shown in FIG. 6d, which can be supplied by PPM 304, provides another example of the information that could be enforced by the PPM. The policy being enforced by the PPM in this embodiment permits a number of different types of identification to be used for authenticating the end entity to the RA operator. Examples include Personal information 662, which could include choices of Driver's License check box 670, Passport check box 672, Credit Card check box 674, and Personal Knowledge check box 676. The RA operator would check the appropriate boxes based upon the information supplied to it by the end entity. The choices available to the RA operator on Identification property page 660 would be dictated by the PPM linked to the policy designated in the policy extension of the X.509 certificate. Other choices could include those in Badge information 680, Biometric information 682, or Document information 684.

Figure 7A:
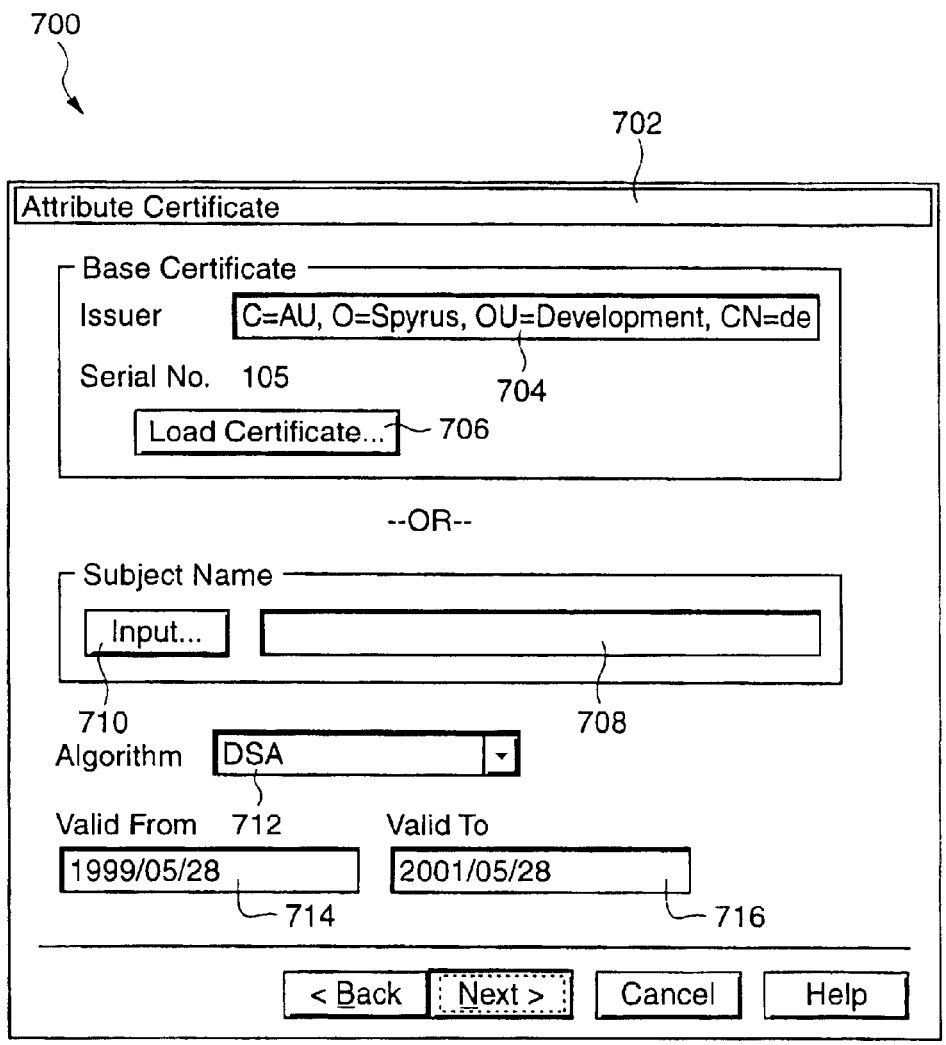
Figure 7B:
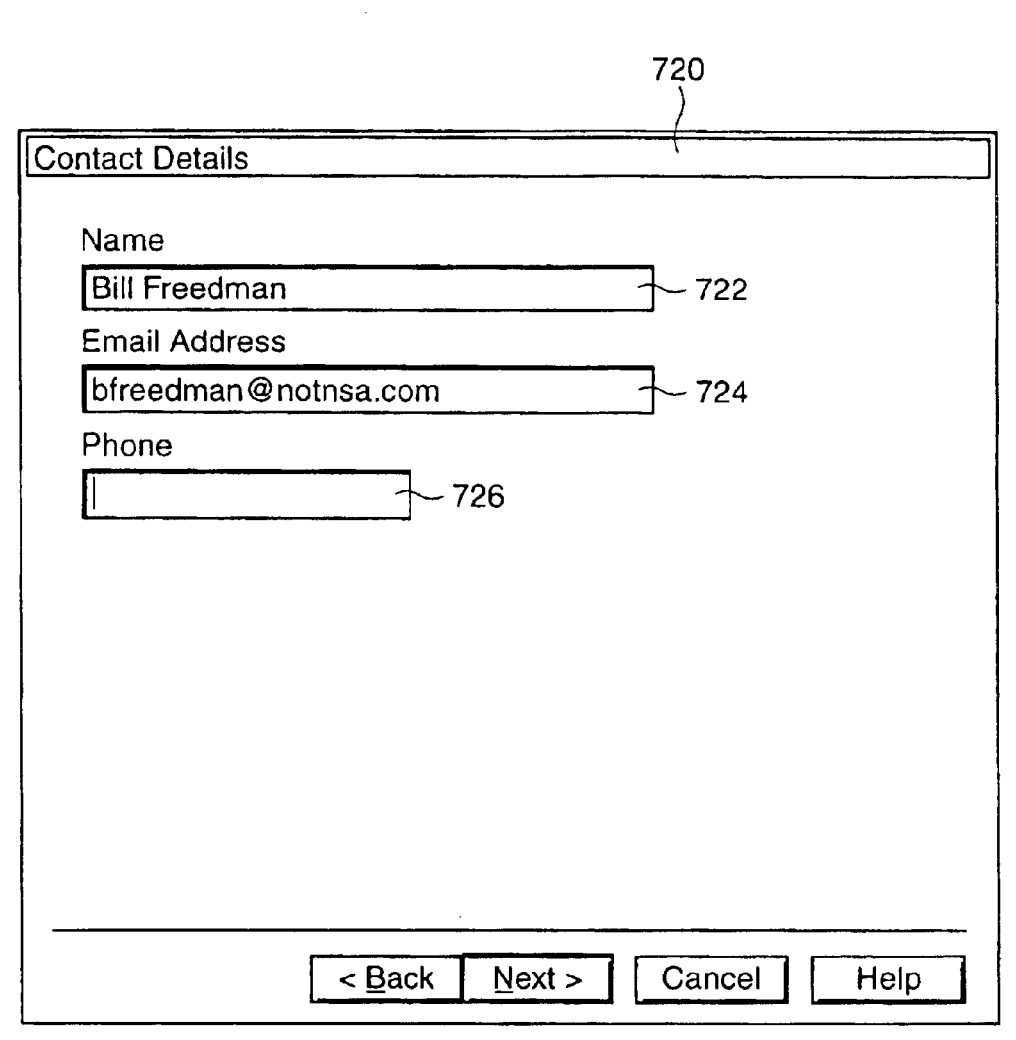

FIG. 7a through FIG. 7c detail one type of property sheet that can be displayed to the RA operator, which occurs when the operator receives a request for an attribute certificate while using the SPYRUS S2CA. However, a PPM can be used for enforcing policy elements of any type of application which requires policy enforcement. The PPM, which was invoked by its linkage to the policy designated in the policy extension of the X.509 certificate, determines which of the fields shown in FIG. 7c must be completed by the operator (i.e. mandatory), those which may or may not be completed by the RA operator (i.e. discretionary), or those which cannot be entered by the RA operator (i.e. prohibited).

FIG. 7a is a screen shot of one embodiment of a property sheet 700, which is displayed to the RA operator when an attribute certificate is requested. One embodiment of a Attribute Certificate property page 702, supplied by RA module 302, contains basic information about the attribute certificate. When the Next button 610 is pressed, the property sheet advances to the Contact Details property page 730.

FIG. 7b depicts one embodiment of a Contact Details property page 720 which RA module 302 supplies when Contact Details tab 703 is selected by the RA operator. Contact Details property page 720 allows the RA operator to enter information about the recipient of the attribute certificate. When the Next button 610 is pressed, the property sheet advances to the Licensing property page 730.

FIG. 7c depicts one embodiment of a Licensing property page 730, which can be supplied by PPM 304, and which can be displayed when License tab 705 is selected by the RA operator. Licensing property page 730 allows the PA operator to enter information about the licensing approach to be used in conjunction with the attribute certificate. For example, the RA operator could specify the registration file for the attribute certificate in edit box 732 and load that registration file by pressing load button 734. This will cause such information as Name 736, Mac Address 738, and Card ID 740 to be loaded from the file specified in edit box 732. in addition, Licensing property page 730 permits the RA operator to specify numerous other pieces of information about the license. This information could include: the type of license to be granted in License Type drop down box 742; the mode of operation of the product upon which the license will be granted in Operation Type drop down box 744; the product upon which the license will be granted in Product drop down box 746; the maximum number of Subscribers in Subscribers edit box 748; the maximum number of subordinates in Subordinates edit box 750; and the maximum number of domains in Domains edit box 752.

The PPM can be developed with the aid of a PPM Development Kit. An embodiment of a PPM Development Kit built and sold by SPYRUS, Inc. of Santa Clara, Calif., comprises a PPM Wizard, software resources and a PPM Client.

The PPM Wizard is a tool which integrates with a general purpose development environment. When activated by a development environment, the PPM Wizard will take as input one or more Certificate Policy Statements (CPS) and automatically produce the core code for the PPM. Manual entry can be used to input policy information when the CPS is unavailable and to provide support for other services (e.g. remote database access). The core code includes, but is not limited to: base project code, the definition and implementation of the classes which realize each of the policies, and the definition and implementation of common resources such as property pages.

The software resources are required when the core code is compiled. They include PPM interface and base class definitions and libraries.

The PPM Client is used to test the PPM in the absence of a PKI. It emulates the processes of PKI elements which access the PPM. It removes the need of the PPM developer to have access to a PKI during early stages of development of the PPM.

Figure 8:
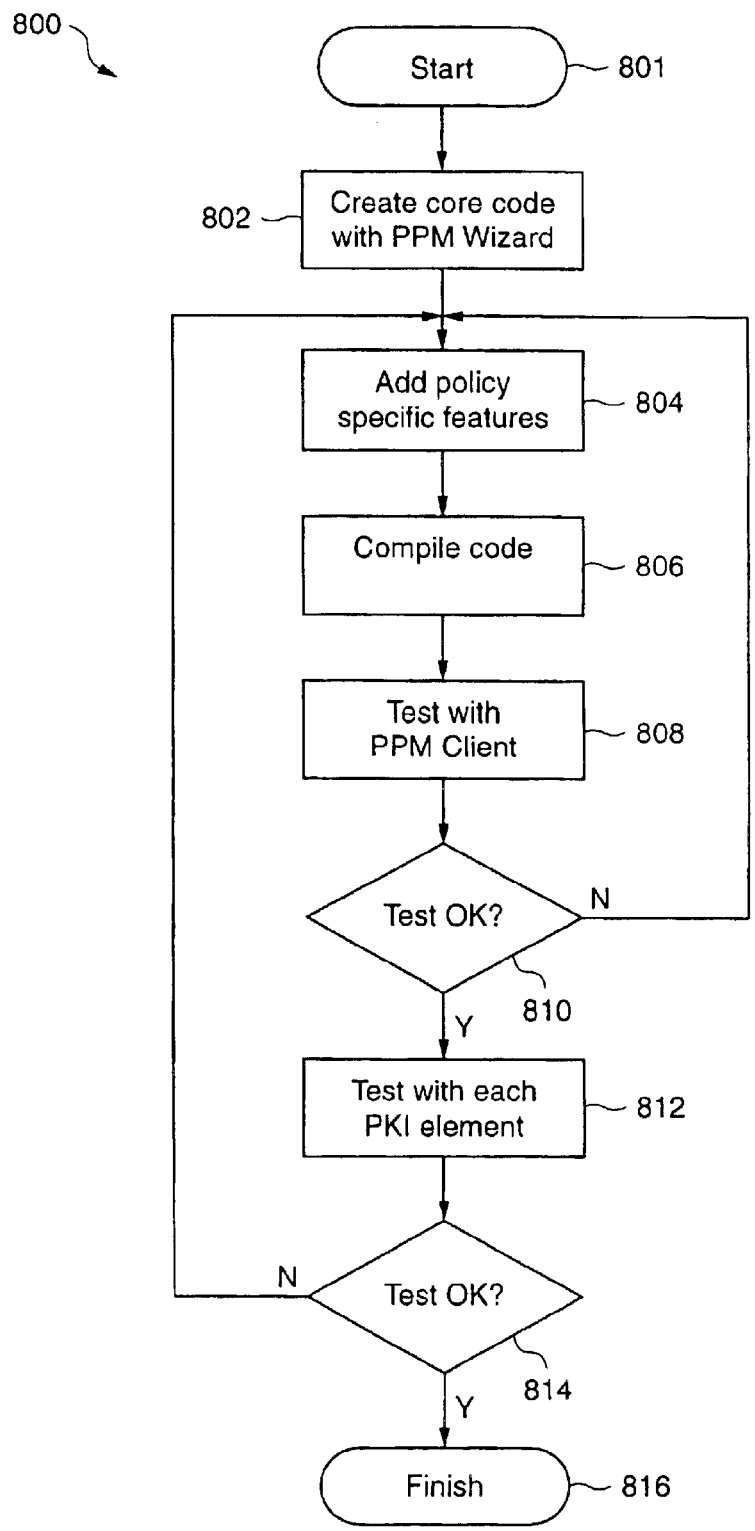
FIG. 8 depicts a system for developing a PPM.

The development process 800 is depicted in FIG. 8. From the development start point 801, the core code is created by the PPM Wizard 802 and iterative development loop is entered until the PPM meets the CPS without error. First specific policy code (additional property page(s)) is added 804 and the result compiled 806. The functionality is tested firstly using the PPM Client. If result test 810 fails return to the top of the loop 804. The functionality is then tested using each of the PKI elements (e.g. RA, CA, PCA) that will access it 812. If result test 814 fails return to the top of the loop 804. The development is complete 816.

Figure 9:
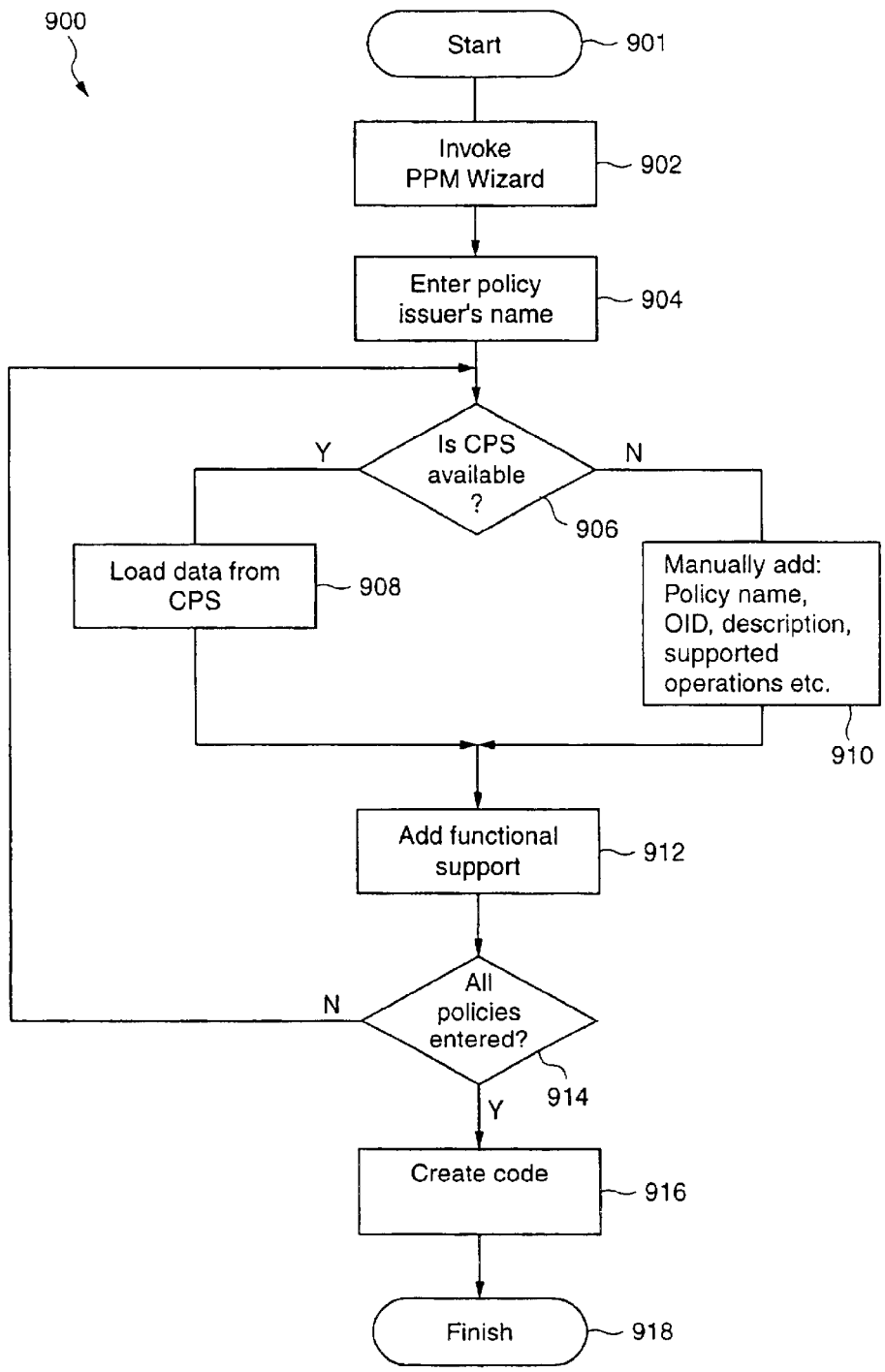
FIG. 9 depicts the operation of a PPM Wizard.

The operation of the PPM Wizard 900 is depicted in FIG. 9. Starting from within the development environment 901, the PPM Wizard is invoked 902. The name of the policy issuer (e.g. Spyrus) is manually entered 904. In this embodiment, all policies are from the same issuer. A loop is started to process the information for each policy. If an electronic form of CPS document is available 906, the policy information is extracted from it 908w otherwise, the information is entered via a user interface 910. Support for optional functionality (e.g. network access) is added 912. When all policies have been entered 914, the core code is generated 916. The PPM Wizard has finished and returns control to the development environment 918.

It is clear that various changes and modifications may be made to the embodiments which have been described, more specifically by substituting equivalent technical means, without departing from the spirit and scope of the invention. Although the methods and systems described can be implemented in a general purpose computer running a software implementation, it should also be apparent that such methods and systems may be carried out in hardware, in firmware, or in more specialized apparatus constructed to perform the required method steps. In addition, the embodiments presented are illustrative. They are not intended to limit the invention to the specific embodiments described and shown in the attached figures. Instead, the invention is defined by the following claims.

We claim:

1. A method for automated policy enforcement during issuance of a certificate by a PKI component, comprising the steps of:
   receiving one or more interface commands in a policy enforcing module; and
   automatically enforcing, with the policy enforcing module, a policy governing issuance of the certificate in response to said one or more interface commands.

2. A method as in claim 1, wherein said enforcing step further comprises generating one or more data entry windows.

3. A method as in claim 2, wherein said one or more data entry windows further comprise property pages.

4. A method as in claim 3, wherein a plurality of said property pages comprise a property sheet.

5. A method for automatically enforcing policy during issuance of a certificate by a PKI component, comprising the steps of:
   in said PKI component:
      initializing a user policy information table;
      determining one or more policy identifiers applicable to said PKI component;
      opening an interface to a policy enforcing module corresponding to one of said policy identifiers;
      automatically configuring said user policy information table with information from said policy enforcing module governing issuance of the certificate;
      automatically negotiating one or more certificate versions between said policy enforcing module and said PKI component in accordance with said information from said policy enforcing module governing issuance of the certificate;
      automatically negotiating one or more algorithm domains between said policy enforcing module and said PKI component in accordance with said information from said policy enforcing module governing issuance of the certificate; and
      automatically validating responses of said policy enforcing module.

6. A method as in claim 5, wherein said determining step further comprises the steps of:
   decoding one or more policy identifiers from a certificate; and
   identifying one or more policy enforcing modules corresponding to said one or more policy identifiers.

7. A method as in claim 6, wherein said certificate is formatted in accordance with the X.509 standard.

8. A method as in claim 7, wherein one or more of said policy identifiers is an object identifier as defined in X.680.

9. A method as in claim 5, wherein said opening step further comprises calling a subroutine for initiating operation of said policy enforcing module.

10. A method as in claim 9, wherein said calling step further comprises the steps of:
   initializing a shared area of memory; and
   specifying pointers to said shared area of memory.

11. A method as in claim 5, wherein said PKI component is a registration authority.

12. A method as in claim 5, wherein said PKI component is a certification authority.

13. A method as in claim 5, wherein said configuring step further comprises the steps of:
  binding the user to one or more policies corresponding to said one or more policy enforcing module;
  loading the descriptions of one or more policies from said one or more policy enforcing module;
  determining one or more request operations permitted under said one or more policies from said one or more policy enforcing modules; and
  populating said user policy information table with said policy identifiers, said descriptions, and said request operations of one or more policies from said one or more policy enforcing module.

14. A method as in claim 5, wherein said configuring step further comprises the steps of:
  generating one or more data entry windows; and
  displaying said data entry windows.

15. A method as in claim 14, wherein said data entry windows further comprise one or more property pages.

16. A method as in claim 15, wherein a plurality of said property pages further comprise a property sheet.

17. A method as in claim 14, wherein said generating step further comprises the steps of:
  initializing a computer application data entry window;
  initializing an administration data entry window; and
  initializing policy enforcing module data entry windows.

18. A system for automated policy enforcement during issuance of a certificate by a PKI component, comprising:
  means for receiving one or more interface commands in a policy enforcing module; and
  means for automatically enforcing, with the policy enforcing module, a policy governing issuance of the certificate in response to said one or more interface commands.

19. A system as in claim 18, wherein said means for enforcing further comprises means for generating one or more data entry windows.

20. A system as in claim 19, wherein said one or more data entry windows further comprise property pages.

21. A system as in claim 20, wherein a plurality of said property pages comprise a property sheet.

22. A system for automatically enforcing policy during issuance of a certificate by a PKI component, comprising:
  in said PKI component:
    means for initializing a user policy information table;
    means for determining one or more policy identifies applicable to said PKI component;
    means for opening an interface to a policy enforcing module corresponding to one of said policy identifiers;
    means for automatically configuring said user policy information table with information from said policy enforcing module governing issuance of the certificate;
    means for automatically negotiating one or more certificate versions between said policy enforcing module and said PKI component in accordance with said information from said policy enforcing module governing issuance of the certificate;
    means for automatically negotiating one or more algorithm domains between said policy enforcing module and said PKI component in accordance with said information from said policy enforcing module governing issuance of the certificate; and
    means for automatically validating responses of said policy enforcing module.

23. A system as in claim 22, wherein said means for determining further comprises:
  means for decoding one or more policy identifiers from a certificate; and
  means for identifying one or more policy enforcing modules corresponding to said one or more policy identifiers.

24. A system as in claim 23, wherein said certificate is formatted in accordance with the X.509 standard.

25. A system as in claim 24, wherein one or more of said policy identifiers is an object identifier as defined in X.680.

26. A system as in claim 22, wherein said means for opening further comprises calling a subroutine for initiating operation of said policy enforcing module.

27. A system as in claim 26, wherein said means for calling further comprises:
  means for initializing a shared area of memory; and
  means for specifying pointers to said shared area of memory.

28. A system as in claim 22, wherein said PKI component is a registration authority.

29. A system as in claim 22, wherein said PKI component is a certification authority.

30. A system as in claim 22, wherein said means for configuring further comprises:
  means for binding the user to one or more policies corresponding to said one or more policy enforcing module;
  means for loading the descriptions of one or more policies from said one or more policy enforcing module;
  means for determining one or more request operations permitted under said one or more policies from said one or more policy enforcing modules; and
  means for populating said user policy information table with said policy identifiers, said descriptions, and said request operations of one or more policies from said one or more policy enforcing module.

31. A system as in claim 22, wherein said means for configuring further comprises:
  means for generating one or more data entry windows; and
  means for displaying said data entry windows.

32. A system as in claim 31, wherein said data entry windows further comprise one or more property pages.

33. A system as in claim 32, wherein a plurality of said property pages further comprise a property sheet.

34. A system as in claim 31, wherein said means for generating further comprises:
  means for initializing a computer application data entry window;
  means for initializing an administration data entry window; and
  means for initializing policy enforcing module data entry windows.

35. A method for creating a policy enforcement module for use in automatically enforcing policy during issuance of a certificate by a PKI component, comprising the steps of:
  creating core communications infrastructure functionality governing issuance of a certificate;
  integrating said core communications infrastructure functionality with specific communications infrastructure functionality governing issuance of a certificate that is particular to one or more PKI components; and
  testing said integrated combination.

36. A method as in claim 35, wherein said communications infrastructure components include PKI components.

37. A method as in claim 36, wherein said PKI component is a registration authority.

38. A method as in claim 37, wherein said PKI component is a certification authority.

39. A method as in claim 35, wherein said creating step further comprises:

entering a name for a policy issuer;

inputting the definition of one or more policies;

adding functional support for said policies; and combining said name, said definitions, and said functional support.

40. A method as in claim 39, wherein said inputting step further comprises:

entering a name for the policy;

adding an object identifier for said policy;

adding a description for said policy; and adding features specific to said policy.

41. A method as in claim 35, wherein said integrating step further comprises compiling code for said communications infrastructure functionality with code for said specific communications infrastructure functionality.

42. A general purpose computer system for use in automatically enforcing policy during issuance of a certificate by a PKI component, comprising:

one or more policy enforcing modules adapted to enforce a policy governing issuance of the certificate;

means for determining one or more policy identifiers;

means for opening an interface to said one or more policy enforcing modules in accordance with said one or more policy identifiers;

means for automatically negotiating one or more certificate versions with said one or more policy enforcing modules in accordance with said policy governing issuance of the certificate; and means for automatically negotiating one or more algorithm domains with said one or more policy enforcing modules in accordance with said policy governing issuance of the certificate.

* * * * *